United States Patent [19]

Nagano

[11] Patent Number: 4,642,679
[45] Date of Patent: Feb. 10, 1987

[54] COLOR IMAGE READING APPARATUS

[75] Inventor: Fumikazu Nagano, Yamatokoriyama, Japan

[73] Assignee: Sharp Kabushiki Kaisha, Osaka, Japan

[21] Appl. No.: 744,474

[22] Filed: Jun. 13, 1985

[30] Foreign Application Priority Data

Jun. 15, 1984 [JP] Japan ............................... 59-124202
Jun. 15, 1984 [JP] Japan ............................... 59-124203
Aug. 2, 1984 [JP] Japan ............................... 59-163713
Aug. 22, 1984 [JP] Japan ............................... 59-175353
Nov. 30, 1984 [JP] Japan ............................... 59-254580

[51] Int. Cl.$^4$ ............................................. H04N 1/46
[52] U.S. Cl. ......................................... 358/75; 358/80
[58] Field of Search .................................... 358/75, 80

[56] References Cited

U.S. PATENT DOCUMENTS 4,318,122 3/1982 White ............................... 358/75 X

FOREIGN PATENT DOCUMENTS

30215 3/1980 Japan ................................... 358/75

Primary Examiner—Randall L. Green
Attorney, Agent, or Firm—Birch, Stewart, Kolasch and Birch

[57] ABSTRACT

A color image reading device for reading an original by an optical scanning device which optically scans across said original line-by-line is disclosed. The color image reading device includes a green fluorescent lamp for generating a green light with an afterglow characteristics, a red fluorescent lamp for generating a red light with no afterglow characteristics, and a blue fluorescent lamp for generating a blue light with no afterglow characteristics. The green, red and blue fluorescent lamps are actuated in a predetermined time sequence. A CCD is provided for detecting an image under green during the afterglow, under red light and under blue light.

13 Claims, 27 Drawing Figures

R-LIGHT (FILTERED)

Fig. 4b

G-LIGHT (AFTERGLOW)

Fig. 4c

B-LIGHT (FILTERED)

COLOR IMAGE READING APPARATUS

BACKGROUND OF THE INVENTION

1. Field of the Invention

The present invention relates to a color image reading device for use in a color facsimile machine, color scanner, or the like, wherein an original color image is separated into different color data which are detected using a CCD sensor.

2. Description of the Prior Art

The prior art color image reading devices can be divided typically into two types, which are:

(1) a type using a white lamp as a light source, in which three different filters red, green and blue, (R, G, B) mechanically replace one after the other sequentially in front of a CCD array to separate the color image into different colors; and (2) a type using a white lamp as a light source, in which three CCD arrays provided with filters R, G, B, respectively, are provided to separate the color image into different colors.

According to the first type, it is very difficult to change the filters rapidly. According to the second type, three different colors are detected at different places where the three CCD arrays are positioned. Therefore, the exact matching of the three color images is very difficult.

To solve the above problem, another type of color image reading device has been proposed which employs three fluorescent lamps for emitting three color lights, red light, green light and blue light, which are turned on sequentially one at a time, and one CCD array for receiving red light image, green light image and blue light image at different times.

However, a fluorescent lamp generally has four strong line spectrums at about 405 nm, 436 nm, 546 nm, and 587 nm, due to mercury contained therein. These line spectrums must be deleted, or otherwise the color separation can not be done properly with a desired result. Of the four line spectrums, the 405 nm and 436 nm line spectrums can be deleted easily using a suitable filter. However, the 546 nm and 587 nm line spectrums are located in a spectrum region of the green fluorescent lamp and, therefore, these line spectrums can not be deleted by the use of filters. Moreover, the presence of 546 nm and 587 nm line spectrums at places within the spectrum region of the green fluorescent lamp, but off from the peak point thereof will adversely affect the separation of green data from CCD output.

SUMMARY OF THE INVENTION

The present invention has been developed with a view to substantially solving the above described disadvantages and has for its essential object to provide an improved color image reading device.

It is also an essential object of the present invention to provide a color image reading device which can eliminate noise signals caused by the afterglow of a green lamp that exists during the red light exposure and blue light exposure.

In accomplishing these and other objects, a color image reading device according to the present invention comprises a green fluorescent lamp for generating a green light with an afterglow characteristics, a red fluorescent lamp for generating a red light with no afterglow characteristics, and a blue fluorescent lamp for generating a blue light with no afterglow characteristics. The green, red and blue fluorescent lamps are actuated in a predetermined time sequence. A CCD is provided for detecting an image under green light during the afterglow, under red light and under blue light, at different time sequences.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DESCRIPTION OF THE PREFERRED EMBODIMENTS

Before the description proceeds to the preferred embodiment, fluorescent lamps and filters used in the present invention will be described.

Figure 2A:
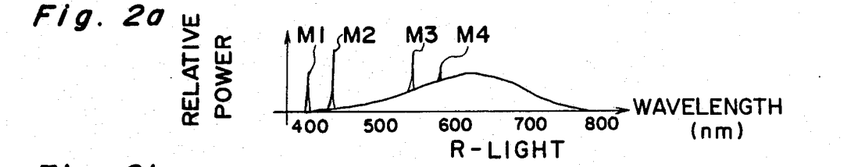
FIGS. 2a, 2b and 2c are graphs showing relative spectral power distributions of lights from a red fluorescent lamp, a green fluorescent lamp and a blue fluorescent lamp, respectively.
Figure 2B:
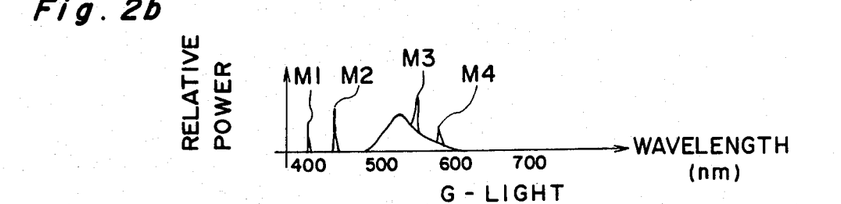
Figure 2C:
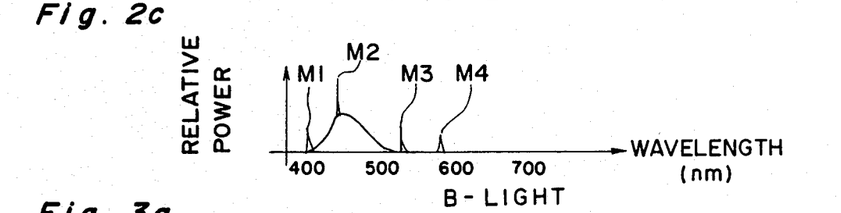

Referring to FIGS. 2a to 2c, graphs illustrated therein show relative spectral power distributions of lights from red fluorescent lamp (R-lamp), green fluorescent lamp (G-lamp) and blue fluorescent lamp (B-lamp), respectively. As indicated in each graph, the mercury line spectrums M1, M2, M3 and M4 are present at the frequencies approximately 405 nm, 436 nm, 546 nm and 587 nm, respectively, in every fluorescent lamp.

As shown in FIG. 2a, the R-lamp has a relatively wide spectrum region, but the region used for detecting red data is only a part in the long wavelength region. Accordingly, by the use of suitable filters, it is possible to eliminate all of the unwanted line spectrums M1–M4.

As shown in FIG. 2c, the B-lamp also has four line spectrums M1–M4. Of these four line spectrums, M1, M3 and M4 can be eliminated by the use of suitable filters. Although the line spectrum M2 can not be eliminated, the presence of line spectrum M2 will not adversely affect the separation of blue data, because the line spectrum M2 is situated close to the peak of the spectrum region.

As shown in FIG. 2b, of the four line spectrums M1–M4 in the spectrum region of G-lamp, M1 and M2 can be eliminated by the use of suitable filters. However, line spectrums M3 and M4 can not be eliminated with the filters.

To eliminate all of the line spectrums M1–M4, according to the present invention, a green fluorescent lamp having an afterglow characteristics is employed. Accordingly, the separation of green data is effected such that the CCD starts charging the green data under the afterglow of the green fluorescent lamp, that is immediately after the cut off of power to the green fluorescent lamp. Since there is no line spectrum contained in the afterglow, the separation of green data under the afterglow can be carried out without any influence by the line spectrum.

However, the use of the afterglow gives rise to such a problem that the afterglow still exists during the separations of the red data and blue data which are carried out sequentially after the separation of the green data. The afterglow which exists during the separations of red data and blue data will result in undesirable noise signals in the separated red data and blue data. The elimination of such noise signals is done by the color image reading device of the present invention, as will be described in detail later.

Figures 3A, 3B, 3C:
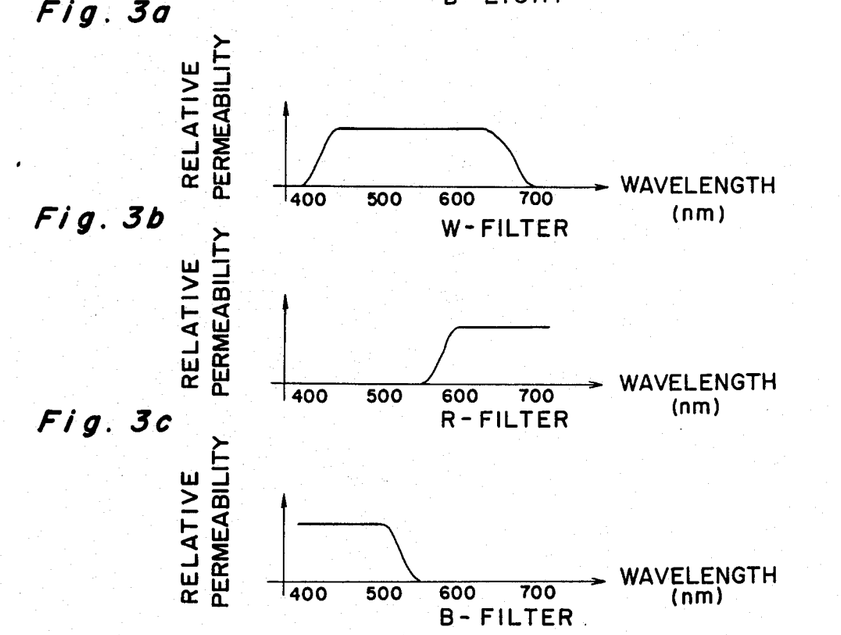
FIGS. 3a, 3b and 3c are graphs showing characteristics of various filters used for cutting line spectrums of mercury.

Referring to FIGS. 3a to 3c, graphs illustrated therein show relative permeability of three different filters for eliminating the unwanted line spectrums mentioned above. The graph of FIG. 3a represents a white filter (W-filter) which permits the lights in the visible region to pass therethrough. The graph of FIG. 3b represents a red filter (R-filter) which permits the red lights to pass therethrough, and the graph of FIG. 3c represents a blue filter (B-filter) which permits the blue lights to pass therethrough. The W-filter is positioned in front of the CCD array, the R-filter is positioned in front of the R-lamp and B-filter is positioned in front of B-lamp.

Figure 4A:
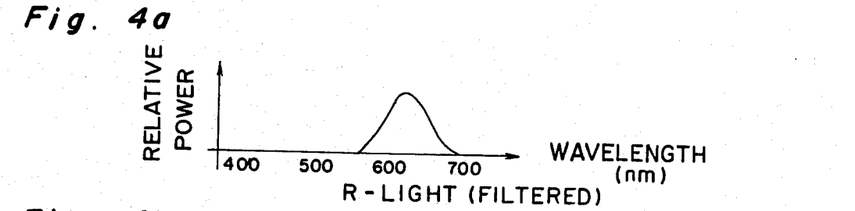
FIGS. 4a, 4b and 4c are graphs showing relative spectral power distributions of lights from a red-lamp, a green-lamp and a blue lamp, respectively, through filters.

Accordingly, the red light emitted from the R-lamp passes through the R-filter and W-filter. Thus the light from the R-lamp will be so filtered as to have a relative spectral power distribution shown in FIG. 4a, wherein line spectrums M1–M4 are eliminated.

Figure 4B:
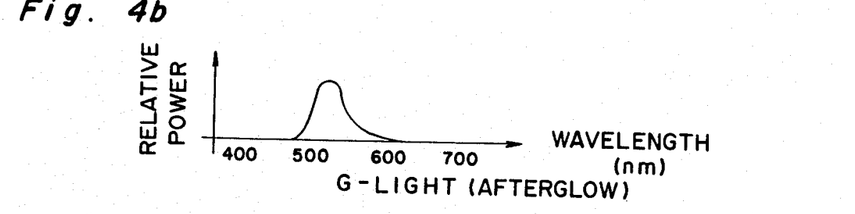
Figure 4C:
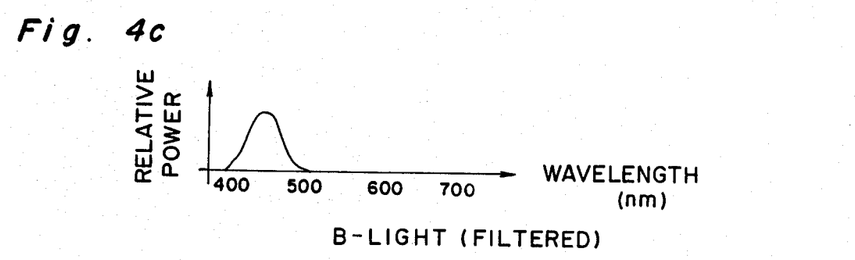

Similarly, the blue light emitted from the B-lamp passes through the B-filter and W-filter. Thus the light from the B-lamp will be so filtered as to have a relative spectral power distribution shown in FIG. 4c, wherein line spectrums M1, M3 and M4 are eliminated.

Furthermore, the green light emitted from the G-lamp passes through only the W-filter. Also, the green light used in the present invention is obtained during the afterglow. Thus, the green lights detected by the CCD will have a relative spectral power distribution shown in FIG. 4b, wherein line spectrums M1–M4 are eliminated.

Figure 5:
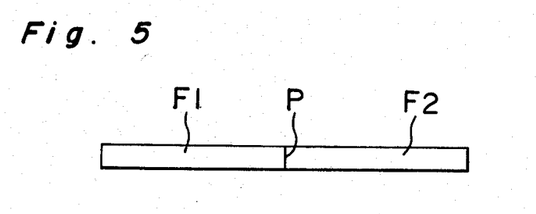
FIG. 5 is a side elevational view of a combined filter of red-filter and blue filter.

Referring to FIG. 5, a side elevational view of a combined filter of R-filter and B-filter is shown. Since it is difficult to make the R-filter and B-filter on a single elongated sheet at the same time, the R- and B-filters are made separately, and then are joined together by a suitable bonding agent, or the like.

Figure 6:
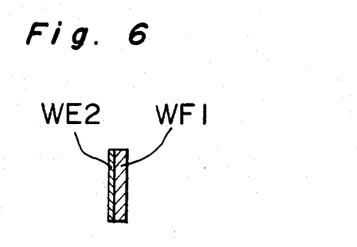
FIG. 6 is a cross sectional view of a white filter.

Referring to FIG. 6, a cross sectional view of the W-filter is shown, which comprises a glass filter WF1 and an interference filter WF2 made of a thin film deposited on glass filter WF1. Glass filter WF1 cuts off the short wavelength region and interference filter WF2 cuts off the long wavelength region.

Figure 7:
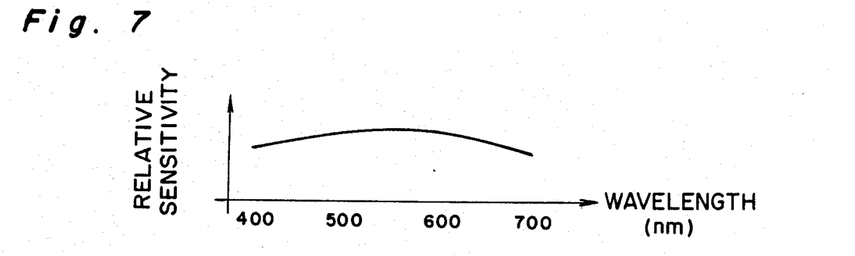
FIG. 7 is a graph showing a sensitivity characteristics of a CCD used in the preferred embodiment.

FIG. 7 shows a relative sensitivity of a CCD array with respect to different wavelengths.

Figure 8A:
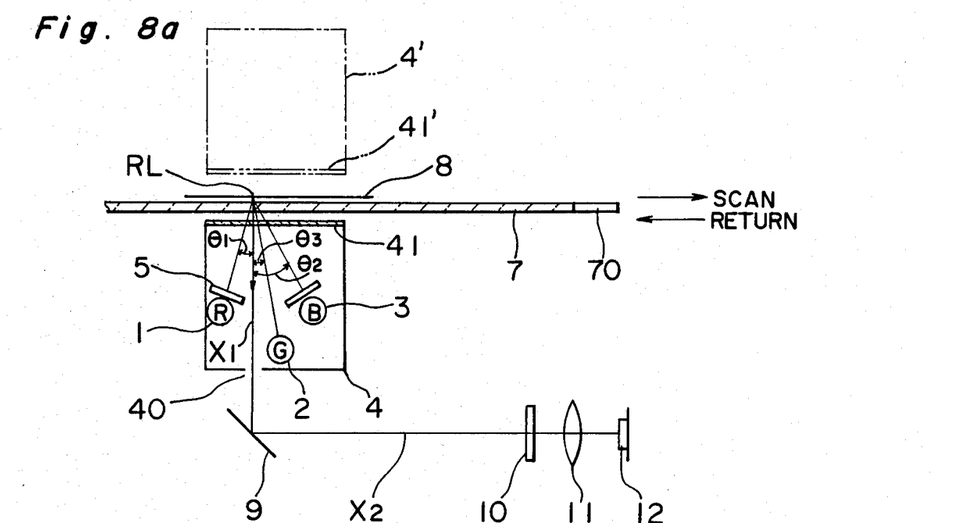
FIG. 8a is a diagrammatic view showing an optical arrangement of the three fluorescent lamps and the parts associated therewith.

Referring to FIG. 8a, an optical arrangement of the color image reading device according to the present invention is shown. Red fluorescent lamp (R-lamp) 1, green fluorescent lamp (G-lamp) 2 and blue fluorescent lamp (B-lamp) 3 are fixedly provided in a casing 4. Red filter 5 is positioned in front of R-lamp 1, and blue filter 6 is positioned in front of B-lamp 3. Casing 4 has a transparent glass plate 41 provided at the upper end of casing 4, when viewed in FIG. 8a. An elongated slit 40 is provided at the bottom of casing 4 for the light passage. Provided immediately above casing 4 is a movable platform 7 for placing an original 8. A white zone 70 is provided at the leading end of platform 7. A ribbon of light emitted from each of lamps 1, 2 and 3 sequentially one after the other is directed and reflects on original 8 at a reading line RL so as to read one particular line on the original. The light reflected on original 8 is transmitted through slit 40, and suitable reflection mirror 9, W-filter 10, and a lens arrangement 11 to CCD array 12 along optical axes X1 and X2.

When the reading of one line on the original completes, that is when one cycle operation completes, a pulse motor 210 (FIG. 1) is actuated to move platform 7 in a SCAN direction, as indicated by an arrow, by a predetermined pitch so as to read the next line on the original. In this manner, the original is read out line by line. When the reading of one original completes, platform 7 is moved in a RETURN direction, as indicated by an arrow, so as to locate white zone 70 at the position where the ribbon of lights is directed. By the use of lights reflected from white zone 70, white balance is carried out.

Figure 8B:
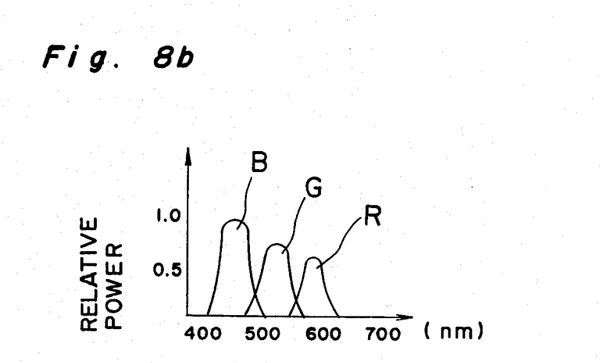
FIG. 8b is a graph showing a relative spectral power distributions of lights from red, green and blue fluorescent lamps.

As indicated in FIG. 8b, the peaks of relative spectral power distributions of lights from red, green and blue fluorescent lamps are different such that the peak of the B-lamp is the highest, that of the R-lamp is the lowest and that of the G-lamp is in the middle. Since it is preferable to make the light intensity at reading line RL the same among three different colors, and since it is preferable to position the three lamps at places where the emitted lights can be utilized with a high efficiency, three lamps 1, 2 and 3 are positioned in a manner described below.

The lamp having the weakest light emission power, i.e., the R-lamp, is positioned on one side of optical axis X1, and the lamps having the first and second strongest light emission power, i.e., the B-lamp and G-lamp are positioned on the other side of optical axis X1.

According to the preferred embodiment, the R-lamp, which is positioned on one side of optical axis X1, is located at such a position that the red light emitted therefrom impinges on reading line RL with the most appropriate incident angle $\theta 1$ with the minimum available distance spaced from reading line RL. Also, the B-lamp and G-lamp are positioned such that the incident angle $\theta 2$ of blue light is greater than the incident angle $\theta 3$ of green light.

Table 1 given below shows an example for positioning R-lamp, G-lamp and B-lamp.

TABLE 1

| Lamp | Incident Angle | Distance to RL |
| --- | --- | --- |
| R-lamp | 26°–30° | 30 mm |
| G-lamp | 16°–20° | 35 mm |
| G-lamp | 46°–50° | 40 mm |

When the above arrangement of R-, G- and B-lamps is employed, the light intensity of the red, green and blue lights at reading line RL will be substantially the same as each other.

Referring again to FIG. 8a, casing 4, which contains the fluorescent lamps may be so positioned on the other side of platform 7, such as shown at 4'. In this case, the transparent glass plate 41 should be changed to a plate 41' which scatters the light. Also, original 8 should have a transparency.

Figure 9:
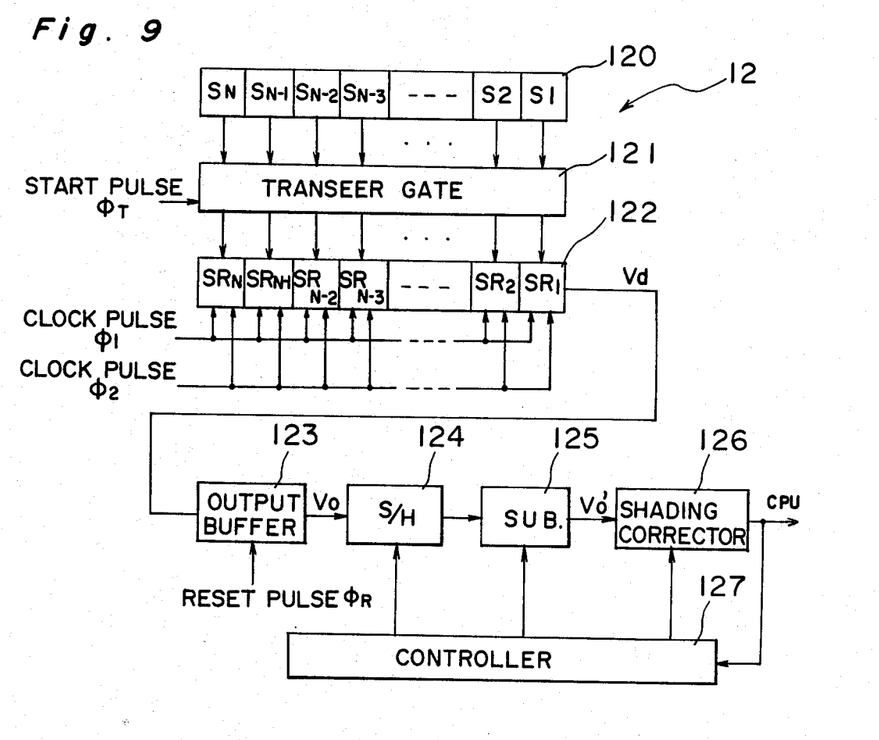
FIG. 9 is a diagrammatic view showing a basic arrangement of the CCD and electric circuit parts for processing the signal produced from the CCD.

Referring to FIG. 9, a basic arrangement of the CCD and electric circuit parts for processing the signal produced from the CCD, according to the present invention, are shown.

CCD array 12 comprises an array of light receiving elements, such as photocells 120, a transfer gate array 121 and an array of shift registers 122. Light receiving element array 120 is defined by N sensors $S_1$–$S_N$ so as to receive reflected lights from reading line RL, which is divided into N picture elements. Thus, each sensor receives data from one picture element. Data of light is accumulated as an electric charge in each sensor, and the accumulated charge is transferred through transfer gate array 121 to analog shift register array 122. The transferred charges are sequentially shifted by clock pulses $\phi 1$ and $\phi 2$ to output buffer 123 which produces a voltage signal Vo. After the every transfer of data from shift register 122, a reset pulse $\phi R$ is applied to output buffer 123 to reset the same. The voltage signal Vo from output butter 123 is applied to a sample/hold circuit 124 and further to a subtraction circuit 125.

In subtraction circuit 125, data corresponding to the afterglow of G-lamp obtained during the separation of red data is subtracted from the red data, and data corresponding to the afterglow of G-lamp obtained during the separation of blue data is subtracted from the blue data. Furthermore, no subtraction is carried out during the separation of green data. The detail of the subtraction will be described later.

Then, a voltage signal Vo' produced from subtraction circuit 125 is applied to a shading corrector 126 in which the white balance correction (shading correction) is carried out. The corrected signal produced from corrector 126 is applied to a CPU (not shown) and also to a controller 127.

Figure 10:
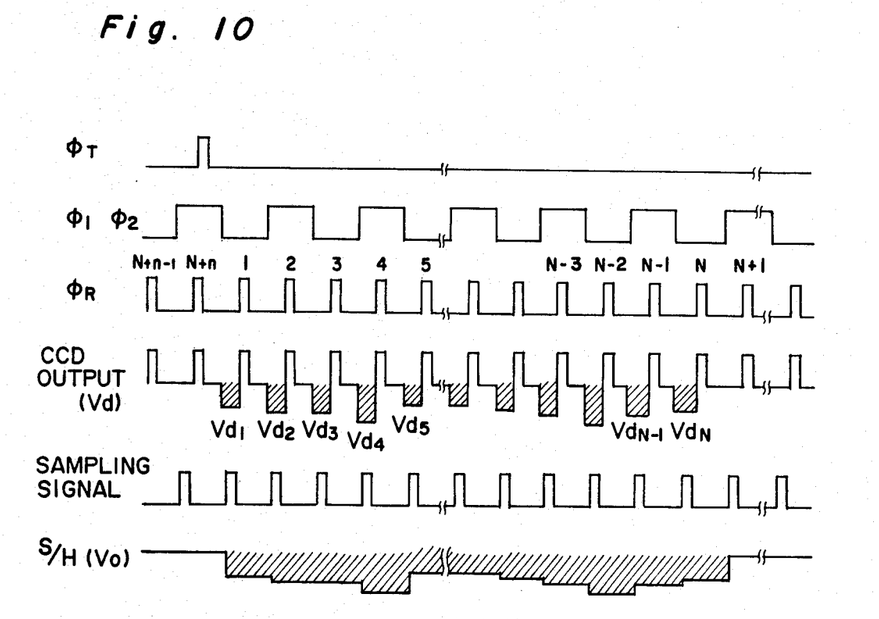
FIG. 10 is a chart showing an operation of the CCD in a timed relationship.

The image reading as carried out by CCD array 12 is shown in FIG. 10. Since the operation of the CCD is known, a further description therefor is omitted for the sake of brevity.

Figure 1:
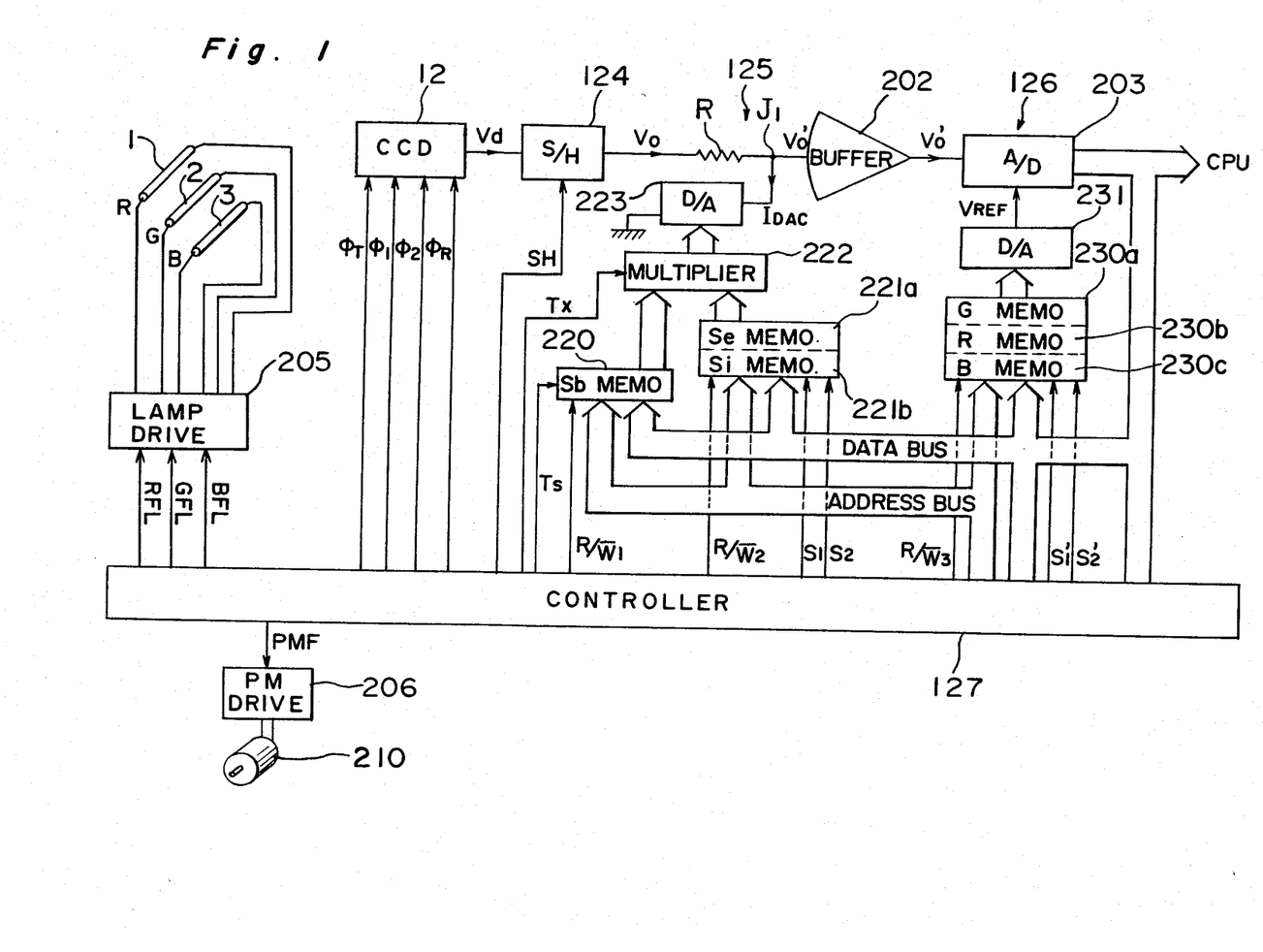
FIG. 1 is a block diagram of a color image reading device according to a preferred embodiment of the present invention.

Referring to FIG. 1, a color image reading device according to a preferred embodiment of the present invention is shown.

Controller 127 produces signals RFL, GFL and BFL to a lamp drive circuit 205 so as to lit G-lamp 2, R-lamp 1 and B-lamp 3 sequentially. A detail of lamp drive circuit 205 will be described later in connection with FIGS. 15–19.

Figure 11:
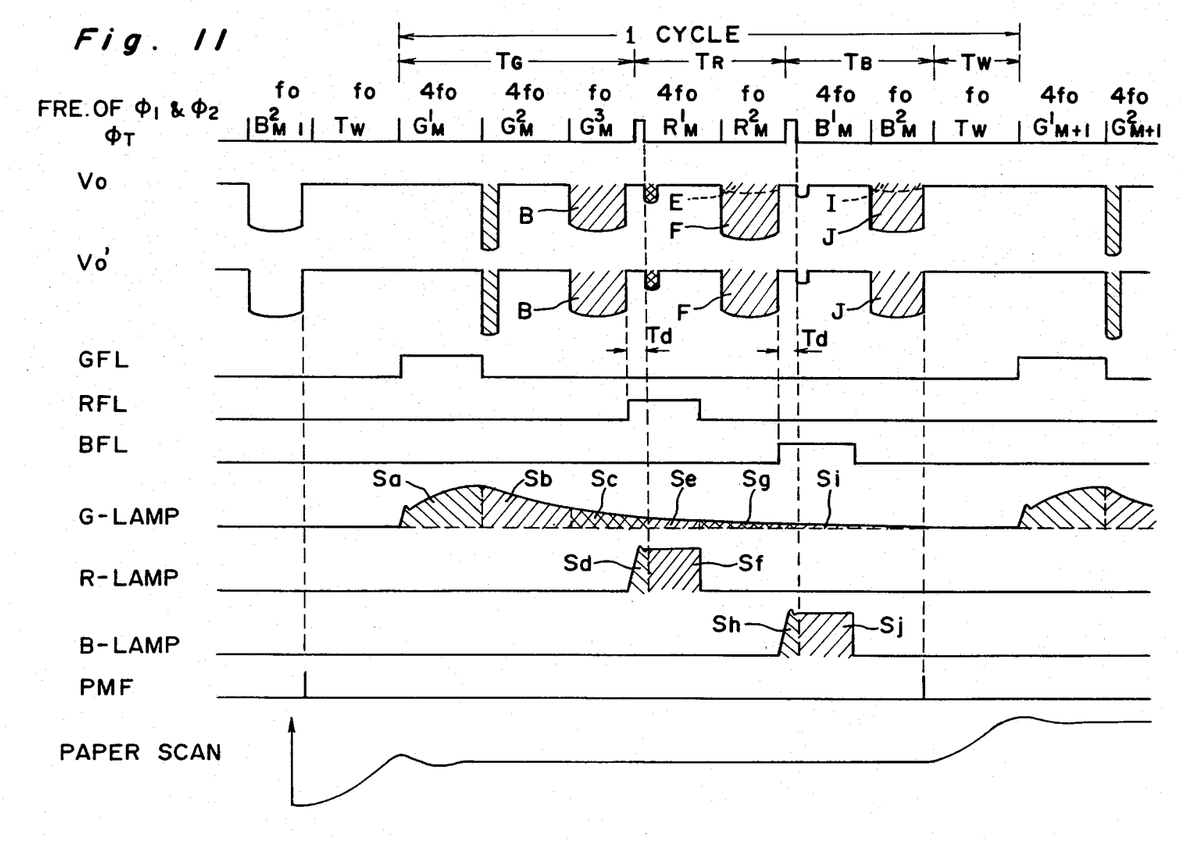
FIG. 11 is a chart showing a general operation for carrying out the color separation in a timed relationship, according to the present invention.

As indicated in FIG. 11, G-lamp 2 lights in response to the signal GFL, but it continues to emit light, even after the signal GFL is gone, by the effect of afterglow. As shown in FIG. 11, the green light emitted during the presence of the signal GFL is indicated at a region Sa, while the green light caused by the afterglow is indicated at regions Sb, Sc, Se, Sg and Si, which are so divided in accordance with various periods for effecting different operations in the color image reading device. In the region Sa, the green light is unstable and contains line spectrums M3 and M4, but in the other regions of the afterglow, the green light is stable with no line spectrums.

R-lamp 1 emits red light in response to the signal RFL, and it stops the light emission when the signal RFL disappears. The red light emitted during the presence of the signal RFL is indicated at regions Sd and Sf, in which the region Sd is an unstable region and the region Sf is a stable region.

Similarly, B-lamp 1 emits blue light in response to the signal BFL, and it stops the light emission when the signal BFL disappears. The blue light emitted during the presence of the signal BFL is indicated at regions Sh and Sj, in which the region Sh is an unstable region and the region Sj is a stable region.

Referring to FIG. 1, a voltage signal Vd produced from CCD array 12 is applied to sample/hold circuit 124 which then produces a voltage signal Vo. The voltage signal Vo is applied to subtraction circuit 125 which comprises a register R, buffer 202, D/A converter 223, multiplier 222, Sb memory 220, Se memory 221a and Si memory 221b.

A junction J1 between register R and buffer 202 is connected to D/A converter 223. When D/A converter is actuated, a current $I_{DAC}$, which is dependent on a signal obtained from multiplier 222, flows out from junction J1 to ground. Accordingly a voltage Vo' at Junction J1 can be given as follows.

$$Vo' = Vo - R \times I_{DAC}$$

Coupled to multiplier 222 is Sb memory 220 defined by N-bit register which memorizes green data of each line image in the form of N picture elements obtained when the original is exposed by the afterglow of the region Sb (FIG. 11) of the G-lamp when each line reading is effected, i.e., in each cycle of operation. At the end of each cycle, Sb memory 220 is reset. Also coupled to multiplier 222 are Se memory 221a and Si memory 221b, each defined by N-bit register. Se memory 221a memorizes green data of a white image in the form of N picture elements obtained when white zone 70 is exposed by the afterglow of the region Se (FIG. 11) at the very beginning of a scan, i.e., before the start reading of an original. Similarly, Si memory 221a memorizes green data of a white image in the form of N picture elements obtained when white zone 70 is exposed by the afterglow of the region Si (FIG. 11) at the very beginning of a scan, i.e., before the start reading of an original. When the reading of one original or a number of originals is completed, Se memory 221a and Si memory 221b are reset and will receive a new data before the reading of a next original.

A buffer 202 temporarily holds and produces the voltage Vo' which is applied to shading corrector 126 which comprises A/D converter 203, D/A converter 231, and memories 230a, 230b and 230c. A/D converter 203 is coupled to a D/A converter 231 which is further coupled to G-memory 230a, R-memory 230b and B-memory 230c, each defined by N-bit register.

G-memory 230a memorizes green data of a white image in the form of N picture elements obtained when white zone 70 is exposed by the afterglow of the region Sb (FIG. 11) at the very beginning of a scan.

Similarly, R-memory 230b memorizes red data of a white image in the form of N picture elements obtained when white zone 70 is exposed by the region Sf at the very beginning of a scan. When the red light is emitted at the region Sf, the afterglow of green light (region Se) still exists, but this can be eliminated in a manner which will be described later.

Likewise, B-memory 230c memorizes blue data of a white image in the form of N picture elements obtained when white zone 70 is exposed by the region Sj at the very beginning of a scan. When the blue light is emitted at the region Sj, the afterglow of green light (region Si) still exists, but this can be eliminated in a manner which will be described later.

When the reading of each line on the original is effected, the read data is compared and normalized by the data stored in memories 230a, 230b, and 230c. If the original is pure white, the read data should have the same data as the data stored in memories 230a, 230b and 230c. In this case, the data produced from A/D converter 203 will have a 100% level for each of the three color signals.

A pulse motor drive circuit 206 is coupled to a pulse motor 210 which moves platform 7 bit-by-bit each time the motor 210 is rotated.

As shown in FIG. 11, one cycle operation for reading one line includes a G-separation period TG, an R-separation period TR, a B-separation period TB and a waiting period TW.

The G-separation period TG is divided into a period $G^1$ in which the G-lamp is supplied with an electric power, a period $G^2$ in which the image reading is carried out, under the light of afterglow, by the photocells in CCD array 12, and a period $G^3$ in which the read green data is processed and converted to digital signal in A/D converter 203.

The R-separation period TR is divided into a period $R^1$ in which the image reading is carried out under the light of the R-lamp as lit by an electric power, and a period $R^2$ in which the read red data is processed and converted into digital signal in A/D converter 203.

The B-separation period TB is divided into a period $B^1$ in which the image reading is carried out under the light of the B-lamp as lit by an electric power, and a period $B^2$ in which the read blue data is processed and converted into digital signal in A/D converter 203.

The subscript M added to the character representing the periods indicates the number of reading lines. The original is shifted by one pitch when the subscript M increases by one.

The frequency of the clock pulses $\phi 1$ and $\phi 2$ for driving the CCD is fo when the read data is processed and converted in A/D converter 203, and during the waiting period TW. In the other periods, the frequency is increased to 4 fo so as to transmit the data out from shift register 122 to output buffer 123 as fast as possible, thereby preventing the accumulation of unwanted data in shift register 122. The period for reading the image and the period for processing the data and the A/D conversion are effected at different time. This is to avoid any error reading caused by the light impinging on shift register 122.

Next, the operation of the color image reading device of FIG. 1 will be described.

The operation is mainly divided into three operations, which are: an afterglow data storing operation for storing data in memories 220, 221a and 221b effected at the very beginning of the thorough operation at which white zone is located in alignment with reading line RL; a shading reference setting operation (or white level setting operation), which is effected immediately after the afterglow data storing operation, for storing data, obtained at the white zone, in memories 230a, 230b and 230c; and an original reading operation in which the read data representing the original is corrected at subtraction circuit 125 to eliminate noise signals due to the afterglow and further corrected at shading circuit 126 to effect the white balance.

First, by the rotation of pulse motor 210, a platform is moved to an initial position at which the white zone 70 is aligned to reading line RL. Under this condition, the afterglow data storing operation and the shading reference setting operation are carried out.

The afterglow data storing operation will be described below in connection with FIGS. 1, 11 and 12.

Figure 12:
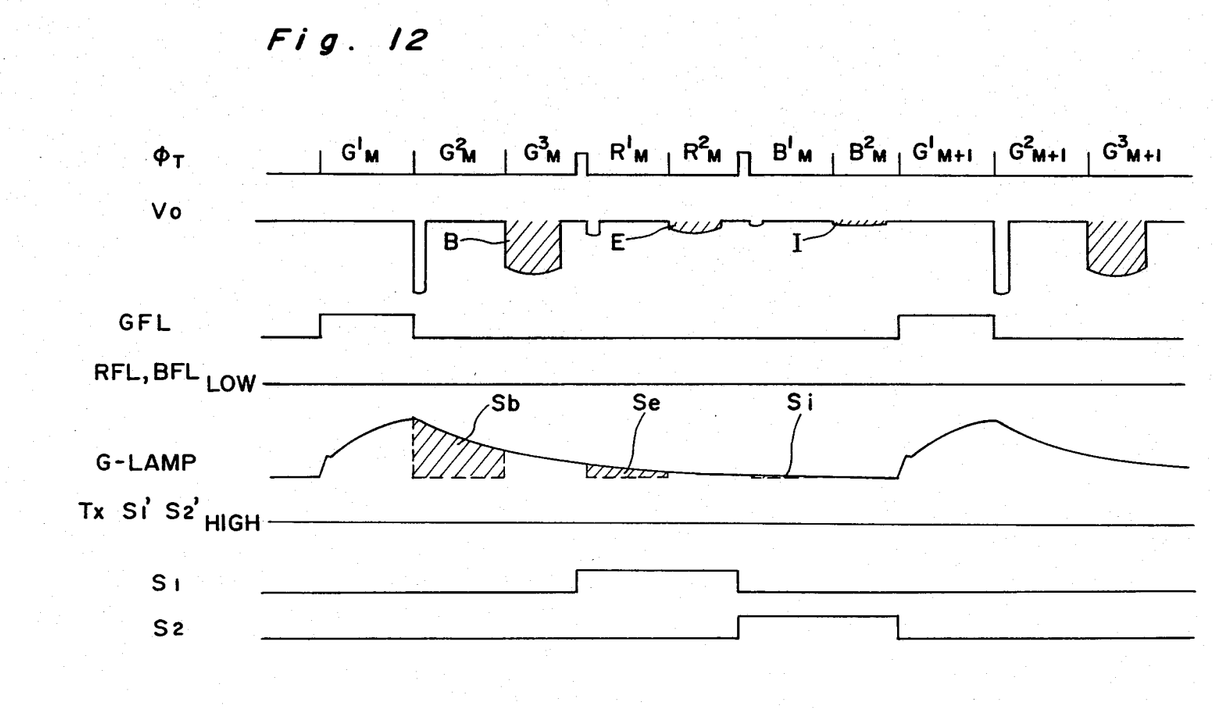
FIG. 12 is a chart showing an operation for storing green data based on the afterglow of the green fluorescent lamp at different times.

Referring particularly to FIG. 12, the G-lamp is lit by the signal GFL in the period $G^1$. Then, in the next period $G^2$, utilizing the region Sb of the afterglow, CCD charges green data which has been reflected from the white zone. During the afterglow data storing operation, a signal Tx applied to multiplier 222 is maintained HIGH so that no signal is provided from multiplier 222 to D/A converter 223. Thus, during this operation, D/A converter 223 generates no subtraction current. Thus, the voltage Vo, carrying the green data of white zone, is transmitted through junction J1, buffer 202 to A/D converter 203 with no substantial change. Then, in the next period $G^3$, the voltage Vo is converted to a digital data in A/D converter 203, and the converted data is stored, e.g., in G-memory 230a, in response to a signal Ts.

It is to be noted that the data stored in Sb memory 220 is defined by N binary signals representing N picture elements, respectively, and at this period, each of N binary signals is weighted as having a level equal to one, indicating that the image is white throughout.

Then, in the period $R^1$, CCD detects afterglow data of green light corresponding to the region Se. Since no subtraction is carried out, the voltage Vo now carrying the green data of the afterglow in the region Se is transmitted to A/D converter 203 without any substantial change. Then, in the next period $R^2$, the voltage Vo is converted to a digital data in A/D converter 203, and the converted data is stored in Se memory 221a in response to a signal S1. The data stored in Se memory 221a is defined by N binary signals representing N picture elements, and indicates a waveform E shown in FIG. 12.

Thereafter, in the period $B^1$, CCD detects afterglow data of green light corresponding to the region Si. Since no subtraction is carried out, the voltage Vo now carrying the green data of the afterglow in the region Si is transmitted to A/D converter 203 with no substantial change. Then, in the next period $B^2$, the voltage Vo is converted to a digital data in A/D converter 203, and the converted data is stored in Si memory 221b in response to a signal S2. The data stored in Si memory 221b is defined by N binary signals representing N picture elements, and indicates a waveform I shown in FIG. 12.

Figure 13:
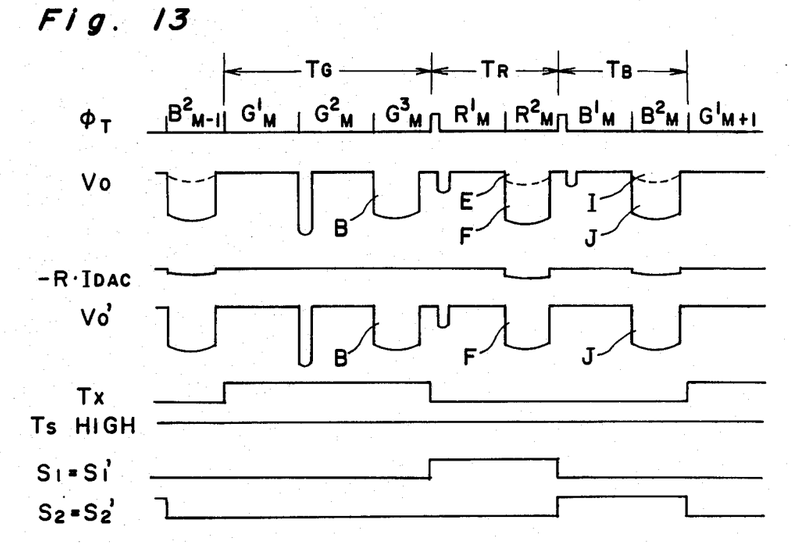
FIG. 13 is a chart showing an operation for storing reference data for each of green, red and blue lights.

Next, the shading reference setting operation will be described below in connection with FIGS. 1, 11 and 13.

During the shading reference setting operation, the white zone is still located in alignment with the reading line RL. First, the G-lamp is lit by the signal GFL in the period $G^1$. In the next period $G^2$, CCD detects green data of the white zone under the afterglow at region Sb. As indicated in FIG. 13, during the G-separation period TG, the signal Tx applied to multiplier 222 is HIGH, so that no signal is provided from multiplier 222 to D/A converter 223. Thus, at this period TG, D/A converter 223 generates no subtraction current. Thus, the voltage Vo, carrying the green data of the white zone detected under the afterglow of the region Sb, is transmitted through junction J1, buffer 202 to A/D converter 203 with no substantial change. Then, in the next period $G^3$, the voltage Vo is converted to digital data in A/D converter 203, and the converted data is stored in G memory 230a, as a G-reference data.

Figure 17:
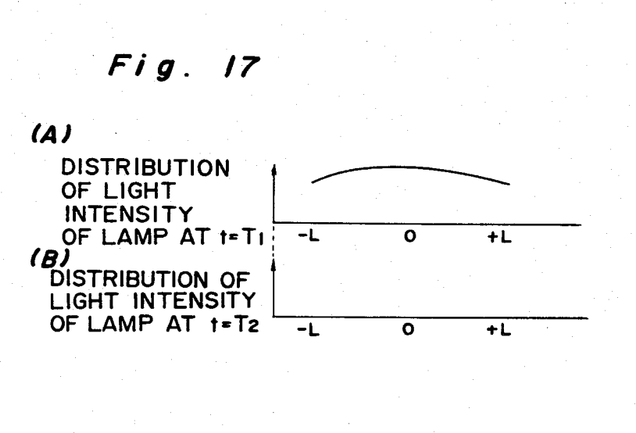
FIG. 17 is a graph showing a distribution of light intensity of a lamp at times T1 and T2 indicated in FIG. 16.

It is to be noted that the G-reference data stored in G memory 230a includes N binary signals each representing one picture element. Thus G memory 230a stores a waveform substantially equal to B shown in FIG. 13. The negative peak of the waveform B, as well as other waves, is rounded, because the light intensity of the lamp is strong at the center and becomes weak towards opposite ends, such as depicted in FIG. 17(A).

Next, the R-lamp is lit by the signal RFL. In the period $R^1$, since the afterglow of green lamp exists, as indicated at region Se, the CCD detects the image of the white zone not under the pure red light, but with a mixture of green light. Thus, the voltage Vo contains data based on the R-lamp at the region Sf and also data based on the G-lamp at the region Se. In this case, the data based on the G-lamp at the region Se serves as a noise signal. Thus, it must be deleted. To this end, during the R-separation period TR, the signal Tx applied to multiplier 222 is made LOW, so that the multiplier 222 produces a signal equal to the product of the data stored in Se memory 221a times the data stored in Sb memory 220. Since the data stored in Sb memory 220 has a level equal to one, the product is the same as the data stored in Se memory 221a, i.e., the waveform E. Thus, D/A converter 223 defines a bypass circuit for extracting a current $I_{DAC}$, which has a waveform similar to E, from junction J1, thereby subtracting the noise signal from the voltage Vo. Accordingly, the voltage signal Vo' at junction J1, such as shown by waveform F, represents an image of the white zone detected under the pure red light.

Then, in the next period $R^2$, the voltage Vo' is converted to a digital data in A/D converter 203, and the converted data is stored in R memory 230b in response to a signal S1, as an R-reference data.

Next, the B-lamp is lit by the signal BFL. In the period $B^1$, since the afterglow of green lamp exists, as indicated at region Si, CCD detects the image of the white zone not under the pure blue light, but with a mixture of green light. Thus, the voltage Vo contains data based on the B-lamp at the region Sj and also data based on the G-lamp at the region Si. In this case, the data based on the G-lamp at the region Si serves as a noise signal. Thus, it must be deleted. To this end, during the B-separation period TB, the signal Tx applied to multiplier 222 is made LOW, so that the multiplier 222 produces a signal equal to the product of the data stored in Si memory 221b times the data stored in Sb memory 220. Since the data stored in Sb memory 220 has a level equal to one, the product is the same as the data stored in Si memory 221b, i.e., the waveform I. Thus, D/A converter 223 defines a bypass circuit for extracting a current $I_{DAC}$, which has a waveform similar to I, from junction J1, thereby subtracting the noise signal from the voltage Vo. Accordingly, the voltage signal Vo' at junction J1, such as shown by waveform J, represents an image of the white zone detected under the pure blue light.

Then, in the next period $B^2$, the voltage Vo' is converted to a digital data in A/D converter 203, and the converted data is stored in B memory 230b in response to a signal S2, as a B-reference data.

Figure 14:
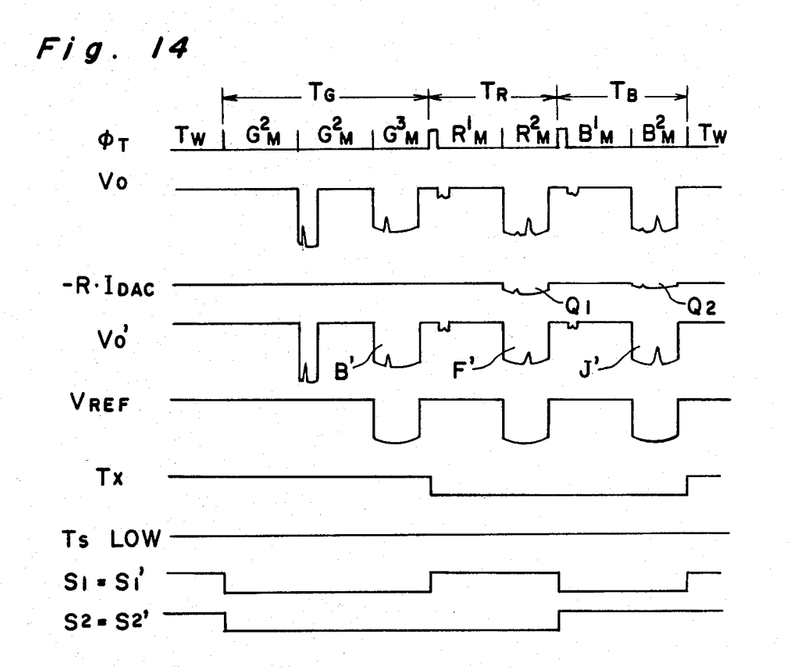
FIG. 14 is a chart showing an operation for reading a color document.

Next, the original reading operation will be described below in connection with FIGS. 1, 11 and 14.

Now, the platform is so scanned to position the original in alignment with the reading line RL. First, the G-lamp is lit by the signal GFL in the period $G^1$. In the next period $G^2$, CCD detects green data of the original under the afterglow at region Sb. As indicated in FIG. 14, during the G-separation period TG, the signal Tx applied to multiplier 222 is HIGH, so that no signal is provided from multiplier 222 to D/A converter 223. Thus, at this period TG, D/A converter 223 generates no subtraction current. Thus, the voltage Vo, carrying the green data of original detected under the afterglow of the region Sb, is transmitted through junction J1, buffer 202 to A/D converter 203 with no substantial change. Then, in the next period $G^3$, the voltage Vo is converted to a digital data in A/D converter 203.

In this case, the A/D conversion at 203 is carried out such that the first binary signal of the data obtained from buffer 202 is compared with the first binary signal of the G-reference data obtained from G-memory 230a. If the two data have the same level, A/D converter 203 generates a binary signal representing a maximum level. If the binary signal of the obtained data is smaller than the binary signal of the G-reference data, due to some figure or character depicted on the original, converter 203 generates a binary signal representing a ratio of the binary signal of the newly obtained data to the binary signal of the G-reference data. In this manner binary signals for N picture elements are produced from A/D converter 203 in the period $G^3$. It is assumed that the data produced from A/D converter 203 in this cycle of operation has a waveform B' shown in FIG. 14, having one dimple close to its trailing edge.

The data B' produced form A/D converter 203 is transmitted to a CPU for the further processing and also to Sb memory 220 at which the converted green data B' is stored temporarily for use in R-separation period TR and B-separation period TB.

Next, the R-lamp is lit by the signal RFL. In the period $R^1$, since the afterglow of green lamp exists, as indicated at region Se, CCD detects the image of the original not under the pure red light, but with a mixture of green light. Thus, the voltage Vo contains original data based on the R-lamp at the region Sf and also original data based on the G-lamp at the region Se. In this case, the original data based on the G-lamp at the region Se serves as a noise signal. Thus, it must be deleted. To this end, during the R-separation period TR, the signal Tx applied to multiplier 222 is made LOW, so that the multiplier 222 produces a signal equal to the product of the data stored in Se memory 221a times the data stored in Sb memory 220. Since the data stored in Sb memory 220 is a binary data representing the distribution of light intensity on one line detected under the green light at region Sb, the product is similar to the waveform B'. Accordingly the subtraction current $I_{DAC}$ generated by D/A converter 223 has a waveform Q1 similar to the waveform B', such as shown FIG. 14. When the subtraction $$Vo-R \times I_{DAC}$$

is effected at junction J1 at the period $R^2$, the difference voltage Vo' will have no noise signal caused by the afterglow of the G-lamp. According to the example illustrated in FIG. 14, the dimple near the trailing edge, which should be contained only in the green data, is eliminated from the red data as indicated by a waveform F'.

Then, in the next period $R^2$, the voltage Vo' having the waveform F' is converted to a digital data in A/D converter 203 in a similar manner described above using R-reference data from R memory 230b.

The data F' produced form A/D converter 203 is transmitted to a CPU for further processing.

Next, the B-lamp is lit by the signal BFL. In the period $B^1$, since the afterglow of green lamp exists, as indicated at region Si, CCD detects the image of the original not under the pure blue light, but with a mixture of green light. Thus, the voltage Vo contains original data based on the B-lamp at the region Sj and also original data based on the G-lamp at the region Si. In this case, the original data based on the G-lamp at the region Si serves as a noise signal. Thus, it must be deleted. To this end, during the B-separation period TB, the signal Tx applied to multiplier 222 is made LOW, so that the multiplier 222 produces a signal equal to the product of the data stored in Si memory 221b times the data stored in Sb memory 220. Since the data stored in Sb memory 220 is a binary data representing the distribution of light intensity on one line detected under the green light at region Sb, the product is similar to th waveform B'. Accordingly the subtraction current $I^{DAC}$ generated by D/A converter 223 has a waveform Q2 similar to the waveform B', such as shown FIG. 14. When the subtraction $$Vo-R \times I_{DAC}$$

is effected at junction J1 at the period $B^2$, the difference voltage Vo' will have no noise signal caused by the afterglow of the G-lamp. According to the example illustrated in FIG. 14, the dimple near the trailing edge, which should be contained only in the green data, is eliminated from the red data as indicated by a waveform J'.

Then, in the next period $B^2$, the voltage Vo' having the waveform J' is converted to a digital data in A/D converter 203 in a similar manner described above using B-reference data from B memory 230c.

The data J' produced form A/D converter 203 is transmitted to a CPU for the further processing.

Figure 15:
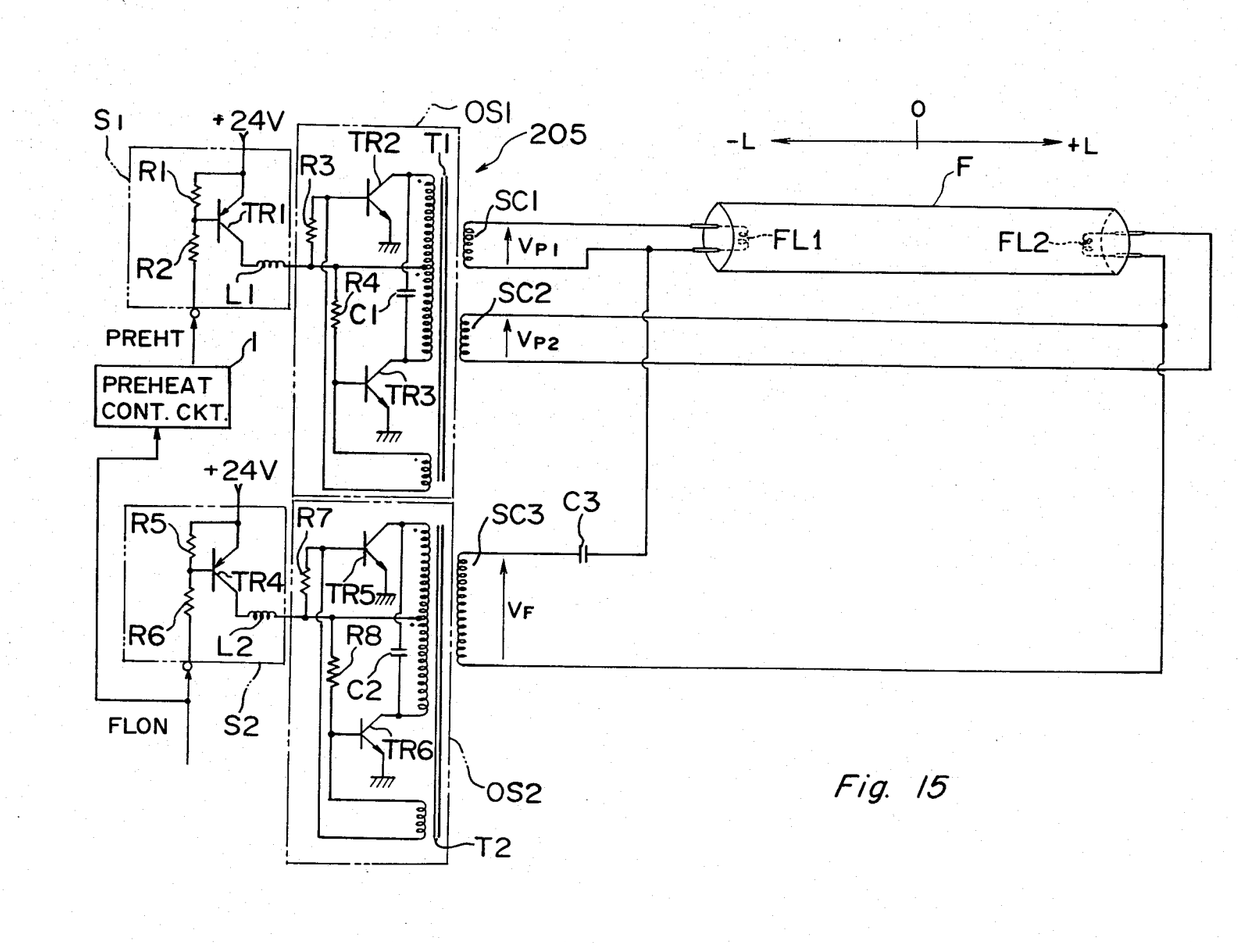
FIG. 15 is a circuit diagram showing a lamp drive circuit for effecting the preheating of each fluorescent lamp.

Referring to FIG. 15 a circuit diagram of one lamp drive circuit 205 according to the present invention is shown. A pair of filaments FL1 and FL2, which form the opposed electrodes of a fluorescent lamp F, are connected, respectively, to secondary windings SC1 and SC2 of a transformer T1. Transformer T1 further has a primary winding and a feedback winding both forming a blocking oscillator OS1 together with transistors TR2 and TR3, a capacitor C1 and resistors R3 and R4. When a voltage is applied to an intermediate tap of the primary winding of transformer T1, blocking oscillator OS1 oscillates at a frequency of 20 KHz. When the oscillation takes place, induction voltages $V_{P1}$ and $V_{P2}$ are produced, which are used to preheat the respective filaments.

The intermediate tap of the primary winding of transformer T1 is connected with a switching circuit S1 which is defined by a transistor TR1, resistors R1 and R2 and an inductor L1. When an input signal PREHT, fed from a preheat control circuit 1 to the base of the transistor TR1 through the resistor R2, becomes LOW, transistor TR1 turns on. Thus, switching circuit S1 supplies a voltage to blocking oscillator OS1. The input signal PREHT supplied from the preheat control circuit 1 is normally held LOW for effecting the preheating of the fluorescent lamp F in the manner described hereinabove. It is to be noted that the inductor L1 is employed for avoiding a possible feedback of a high frequency component from oscillator OS1.

Preheat control circuit 1 detects the level of a signal FLON as will be described later, and generates a signal PREHT in a HIGH level for a predetermined time (for example, a few hundreds of microseconds) in response to the detection of a change of the signal FLON from LOW to HIGH.

The filament FL1 of the fluorescent lamp F is also connected through a capacitor C3 to one end of the secondary winding SC3 of a transformer T2. The other end of the secondary winding SC3 of the same transformer T2 is connected to the filament FL2 of the lamp F. The transformer T2 also has a primary winding and a feedback winding, both forming a blocking oscillator OS2 together with transistors TR5 and TR6, a capacitor C2, and resistors R7 and R8. When a voltage is applied to an intermediate tap of the primary winding of the transformer T2, blocking oscilltor OS2 oscillates at a frequency of 20 KHz. Thus, an induction voltage $V_F$ is generated across the secondary winding SC3. The voltage $V_F$ is used to initiate the discharge between the filaments FL1 and FL2 thereby to cause the lamp F to be lit. It is to be noted that the capacitor C3 is provided to regulate the flow of an electric current to the lamp F during the lighting of the lamp F.

The supply of the voltage to the intermediate tap of the transformer T2 is effected through a switching circuit S2 defined by a transistor TR4, resistors R5 and R6 and an inductor L2. When the signal FLON fed through the resistor R6 from a control (not shown) is LOW, transistor TR4 turns on. Thus, switching circuit S2 supplies the voltage to the blocking oscillator OS2. Inductor L2 is provided also to prevent a high frequency component from being fed back from the blocking oscillator OS2.

The lamp drive circuit 205 of the above described construction operates in the following manner.

Figure 16:
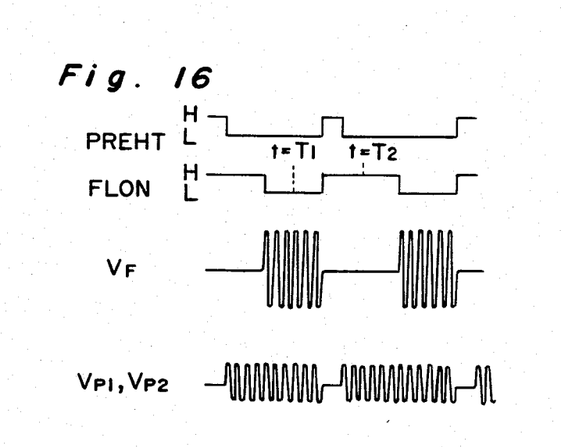
FIG. 16 is a graph showing waveforms for effecting the preheat according to the present invention.

Referring to FIG. 16, waveforms of the signals PREHT, FLON, $V_F$ and $V_{P1}$ and $V_{P2}$ are shown. When the signal FLON fed from the control (not shown) to switching circuit S2 is LOW, blocking oscillator OS2 generates an AC voltage $V_F$ which is supplied between the filaments FL1 and FL2 in the manner as hereinbefore described so as to actuate the fluorescent lamp F to emit light. Then, when the signal FLON is made HIGH the power to the fluorescent lamp F is cut. Also, in response to the change of signal FLON from LOW to HIGH, preheat control circuit 1 causes its output signal PREHT from LOW to HIGH, and it maintains the HIGH from a short period of time, such as several hundreds microseconds. During the signal PREHT is HIGH, the generation of voltages $V_{P1}$ and $V_{P2}$ stop, thereby interrupting the preheating of the filaments FL1 and FL2.

Referring now to FIG. 17, and during the time (t=T1) in which the signal FLON is LOW, the fluorescent lamp F emits a substantially uniform intensity of light over the entire length thereof as shown in the graph of FIG. 17(A). However, when the signal PREHT becomes HIGH for the predetermined period of time in response to the change of the signal FLON from LOW to HIGH, preheating voltages $V_{P1}$ and $V_{P2}$ are zeroed during that period. Accordingly, in response to the change of the signal FLON from LOW to HIGH, the lamp F can be turned off completely without an accompanying glow discharge which would take place as a result of the difference in potential across each of the filaments FL1 and FL2 existing immediately after the turn off of the lamp F.

Although the preheating voltages $V_{P1}$ and $V_{P2}$ are again applied to the respective filaments FL1 and FL2 immediately after the predetermined time in which the signal PREHT is made LOW, no glow discharge takes place in the fluorescent lamp F, because the preheating voltages $V_{P1}$ and $V_{P2}$ have been zeroed for the predetermined time subsequent to the set-up of the signal FLON to HIGH, as shown in the graph of FIG. 17(B), which illustrates the distribution of light emitted by the lamp F at a moment t=T2.

Figure 18:
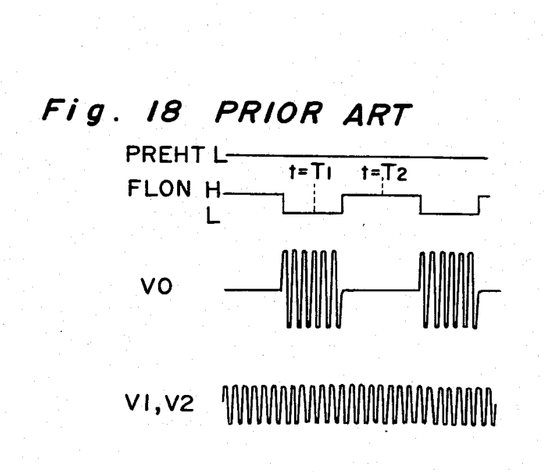
FIG. 18 is a graph showing waveforms for effecting the preheat according to the prior art.
Figure 19:
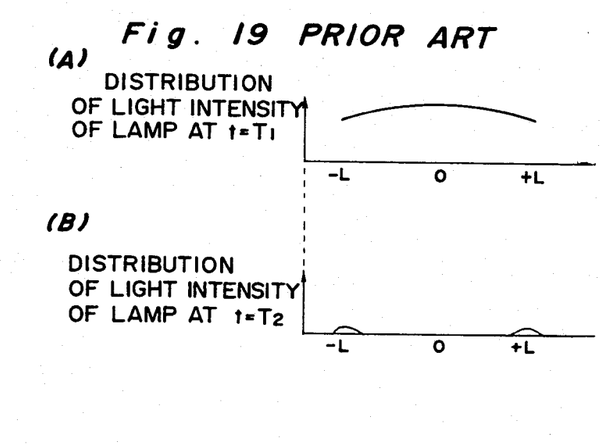
FIG. 19 is a graph showing a distribution of light intensity of a lamp at times T1 and T2 indicated in FIG. 18.

According to the prior art, the signal PREHT is kept LOW all the times regardless of the level of the signal FLON signal of that the preheating voltages can be constantly supplied to the filaments of the fluorescent lamp as can be understood from the chart of FIG. 18. In this prior art instance, the signal PREHT is in the low level state even when the signal FLON sets up to the high level state and accordingly, the filaments of the fluorescent lamp are kept preheated by the preheating voltage. Therefore, as can be understood from the comparison of the graphs of FIGS. 19(A) and 19(B), the lamp is not completely turned off, but with a glow discharge occurring at the opposite ends, across each fluorescent lamp.

Since the preheating voltages $V_{P1}$ and $V_{P2}$ are cut for a very short period of time after the end of each light emission from the fluorescent lamp, undesirable glow discharge can be eliminated. Also, since such a period is very short, the preheating of the fluorescent lamp can be done properly.

It is to be noted that the above described circuit is provided for each of R-lamp, G-lamp and B-lamp.

According to the present invention, since a green lamp, which provides an afterglow, is employed, undesirable line spectrums in the light emitted from the green fluorescent lamp can be eliminated. Furthermore, since the subtraction circuit is provided, the afterglow will not cause any influence during the image reading under the red lamp or under the blue lamp.

Figure 20:
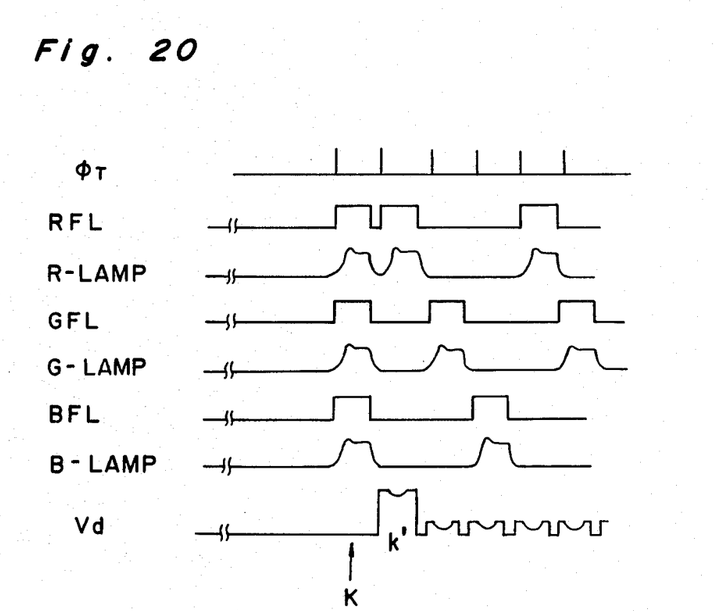
FIG. 20 is a graph showing the operation of three fluorescent lamps which are actuated at the same time at the beginning of each cycle of operation to ensure the uniform emission of light through out the operation.

Referring to FIG. 20, waveforms of signals for effecting light emission from each lamp and the lights emitted thereby are shown. In the case where the G-lamp with no afterglow is employed, it is preferable to emit lights at the same time before starting the image reading of each line, so as to bring the condition of lamps in the same condition between different lines. If the lights are not lit at the same time before reading each line, the lamp is lit after a time span which varies widely depending on the length of waiting time. It has been empirically found that the difference in the waiting time results in difference in the image reading effected after such a time span. To avoid such a difference, lamps are lit immediately before the sequential lighting of the three lamps. When this is done, the image can be read uniformly.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. A color image reading device for reading an original comprising:
   first light source for generating a first light with an afterglow characteristics;
   second light source for generating a second light with no afterglow characteristics;
   third light source for generating a third light with no afterglow characteristics;
   a control means for sequentially actuating said first, second and third lights in a predetermined time sequence;
   image detecting device for detecting image under said first light during the afterglow, under the second light, and under the third light.

2. A color image reading device for reading an original by an optical scanning device which optically scans across said original line-by-line, said color image reading device comprising:
   first light source for generating a first light with afterglow characteristics;
   second light source for generating a second light with no afterglow characteristics;
   third light source for generating a third light with no afterglow characteristics;
   a control means for sequentially actuating said first, second and third lights at a first period, a second period and a third period, respectively, in a predetermined time sequence;
   image detecting device for detecting image under said first light during the afterglow at said first period and producing a first image signal, under said second light at said second period and producing a second image signal, and under said third light at said third period and producing a third signal.

3. A color image reading device as claimed in claim 2, wherein said first, second and third lights are green, red and blue lights, respectively.

4. A color image reading device as claimed in claim 2, wherein said first, second and third light sources comprise three fluorescent lamps.

5. A color image reading device as claimed in claim 4, wherein a fluorescent lamp having the weakest light intensity is located on one side of an optical path from said original to said image detecting device, and fluorescent lamps having the strongest and middle light intensity are located on an other side of said optical path.

6. A color image reading device as claimed in claim 4, further comprising a driving circuit for driving each of said three fluorescent lamps, said driving circuit comprising a first signal for actuating a fluorescent lamp and a second signal for preheating said fluorescent lamp, said second signal being cut off at least for a short period of time immediately after the end of each first signal.

7. A color image reading device as claimed in claim 2, wherein said image detecting device comprises a CCD.

8. A color image reading device as claimed in claim 2, further comprising first storing means for storing a data of said afterglow obtained at said first period, second storing means for storing a data of said afterglow obtained at said second period, and third storing means for storing data of said afterglow obtained at said third period.

9. A color image reading device as claimed in claim 8, wherein said data stored in said second and third storing means are obtained upon detection of a white image at the beginning of said scan.

10. A color image reading device as claimed in claim 8, wherein said data stored in said first storing means is obtained upon detection of each line of said original.

11. A color image reading device as claimed in claim 8, further comprising:

a first multiplier for multiplying said data stored in said first storing means with said data stored in said second storing means and producing a first product;

first subtracting means for subtracting said first product from said second image signal;

a second multiplier for multiplying said data stored in said first storing means with said data stored in said third storing means and producing a second product; and second subtracting means for subtracting said second product from said third image signal;

whereby unwanted data caused by said afterglow of said first light source and present in each of said second and third image signal are eliminated.

12. A color image reading device as claimed in claim 11, wherein said first and second multipliers are in common and wherein said first and second subtracting means are in common.

13. A color image reading device as claimed in claim 2, further comprising:

fourth storing means for storing said first image signal obtained upon detection of a white image at the beginning of said scan;

fifth storing means for storing said second image signal obtained upon detection of said white image at the beginning of said scan;

sixth storing means for storing said third image signal obtained upon detection of said white image at the beginning of said scan;

normalizing means for normalizing said first image signal obtained upon detection of an original image with said first image signal stored in said fourth storing means, normalizing said second image signal obtained upon detection of said original image with said second image signal stored in said fifth storing means, and normalizing said third image signal obtained upon detection of said original image with said third image signal stored in said sixth storing means.

* * * * *